US009887957B2

(12) United States Patent
Choquette et al.

(10) Patent No.: US 9,887,957 B2
(45) Date of Patent: Feb. 6, 2018

(54) SYSTEMS AND METHODS FOR LOCALIZATION BASED ON INTERNET TERMINAL LOCATION (71) Applicant: Hughes Network Systems, LLC, Germantown, MD (US)

(72) Inventors: George Choquette, Potomac, MD (US); Robert James Torres, New Market, MD (US); Nagesh Javali, Germantown, MD (US); John Leonard Border, Middletown, MD (US); Gregory Presbury, Germantown, MD (US); Ramakrishnan Jayant, Clarksville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 125 days.

(21) Appl. No.: 14/730,109

(22) Filed: Jun. 3, 2015

(65) Prior Publication Data
US 2016/0359798 A1    Dec. 8, 2016

(51) Int. Cl.
G06F 15/16 (2006.01)
H04L 29/12 (2006.01)
H04L 29/06 (2006.01)

(52) U.S. Cl.
CPC ...... *H04L 61/1511* (2013.01); *H04L 61/2007* (2013.01); *H04L 65/1023* (2013.01); *H04L 61/609* (2013.01)

(58) Field of Classification Search
USPC .......................... 709/225, 245, 223, 218, 228
See application file for complete search history.

(56) References Cited

U.S. PATENT DOCUMENTS

2009/0043900 A1    2/2009  Barber

FOREIGN PATENT DOCUMENTS

EP            2355439            8/2011

OTHER PUBLICATIONS

International Search Report and the Written Opinion for International App No. PCT/US2016/035577, mailed Sep. 6, 2016, Authorized Officer: Rummery, Audrey.

Primary Examiner — Lan-Dai T Truong
(74) Attorney, Agent, or Firm — Sheppard, Mullin, Richter & Hampton LLP; Daniel N. Yannuzzi (57) ABSTRACT Methods and systems for providing sourcing Internet access requests from ISP subscribers serviced by a gateway not physically located near the subscribers. As the localization needs of all subscribers are not necessarily the same, the gateway determines an appropriate source IP address to use to ensure that the IP protocol localization features work efficiently. In addition, the gateway can help enforce rules related to the governing law of the geographic area of the subscriber and/or rules based on the content providers licensing. Through determination of the context of a request, the gateway may also determine whether localized sourcing of a request is necessary based on the type of content being requested.

28 Claims, 9 Drawing Sheets

SYSTEMS AND METHODS FOR LOCALIZATION BASED ON INTERNET TERMINAL LOCATION

TECHNICAL FIELD

The disclosed technology relates generally to communications networks, and more particularly, some embodiments relate to systems and methods for localizing content and enforcing content access rules.

DESCRIPTION OF THE RELATED ART

Localization is an Internet-based feature that can provide one of several services, all of which either attempt to customize the user experience to their location and/or to make content available—or block content—as a function of the user's location. Conventional algorithms and heuristics for determining localization are based on the source IP address of the traffic seen by the servers comprising the Internet.

Internet Service Providers, or ISPs, may have multiple points of presence (PoP), or interfaces where the ISP's network interfaces with the other autonomous systems (AS) that comprise the Internet. The PoP serves as an aggregation point, where all subscriber traffic within the network seeking content hosted by another AS is aggregated and transmitted to the Internet. Gateways within the ISP's network aggregate the subscriber traffic for transmission to the Internet at the ISP's PoPs. The Internet sees the IP address of the gateway as the source IP address utilized for applying any localization functions to the request.

Typically, network coverage of ISPs is localized to the customers being served. This means that the gateway servicing a subscriber is physically located close to the subscriber. Therefore, the localization needs of the subscribers serviced by a gateway are the same, so the use of the IP address of the gateway for localization is sufficient to ensure that the access expectations of each subscriber is met.

BRIEF SUMMARY OF EMBODIMENTS

According to various embodiments of the disclosed technology, systems and methods can be configured to provide the proper source IP address for localization features of the IP protocol where the servicing gateway is not physically located near the requesting subscriber. ISPs employing large coverage distribution technologies, such as satellite broadband communications, are capable of servicing subscribers from different geographic areas through the same network gateway. Unlike traditional ISP networks that locate the servicing gateway physically close to the subscribers serviced, the localization needs of subscribers serviced by a gateway in a different geographic area are not necessarily the same. By sourcing subscriber access requests based on the geographic area where the subscriber is located, the ISP can provide the proper source IP address to the Internet for use by the built-in localization features even where the subscriber is being serviced by a gateway in another geographic area. In addition, a subscriber management module can be employed to enforce content access restrictions for each geographic area, such as governing laws and access rights identified by the content provider.

Moreover, by considering the context of a request, the gateway can determine whether localization is required. For requests that do not require local sourcing, the gateway can utilize an IP address that would require the fewest number of hops through the Internet to retrieve the information.

According to various embodiments of the disclosed technology, a method is provided for determining an appropriate source IP address to reconcile a request from a subscriber. A gateway receives an access request and identifies the IP address of the requesting subscriber. Based on the IP address, the gateway identifies the geographic area of the requesting subscriber and obtains a geographic area-specific policy maintained either locally at the gateway or provided by a network administrator. Using the geographic area-specific policy, the gateway determines the appropriate source IP address to ensure that the subscriber obtains content that is properly localized by the features of the IP protocol, and that the request is allowable based on content access rules based on the laws of the geographic area and/or the content provider. In some embodiments, the gateway determines the context of the request, such as the type of content sought, and uses that to further determine whether localized sourcing of the request is required, or if it would be faster to source the request using an IP address associated with the geographic area of the gateway.

According to an embodiment of the disclosed technology, a context-aware gateway is provided that may use one or more different IP address ranges. The context-aware gateway comprises a subscriber interface module for receiving requests from a plurality of subscribers serviced by the context-aware gateway; a subscriber management module maintaining an association list and one or more geographic area-specific policies; a DPI module; and a virtual DNS module including a plurality of virtual DNS servers; wherein the context-aware gateway services at least one subscriber that is located in a different geographic area than the context-aware gateway.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION OF THE EMBODIMENTS

Embodiments of the technology disclosed herein are directed toward systems and methods of providing a context-aware gateway configured to determine the appropriate source IP address to use. This determination can be made, for example, based on the geographic area associated with the subscriber's IP address and the context of the request.

Figure 1:
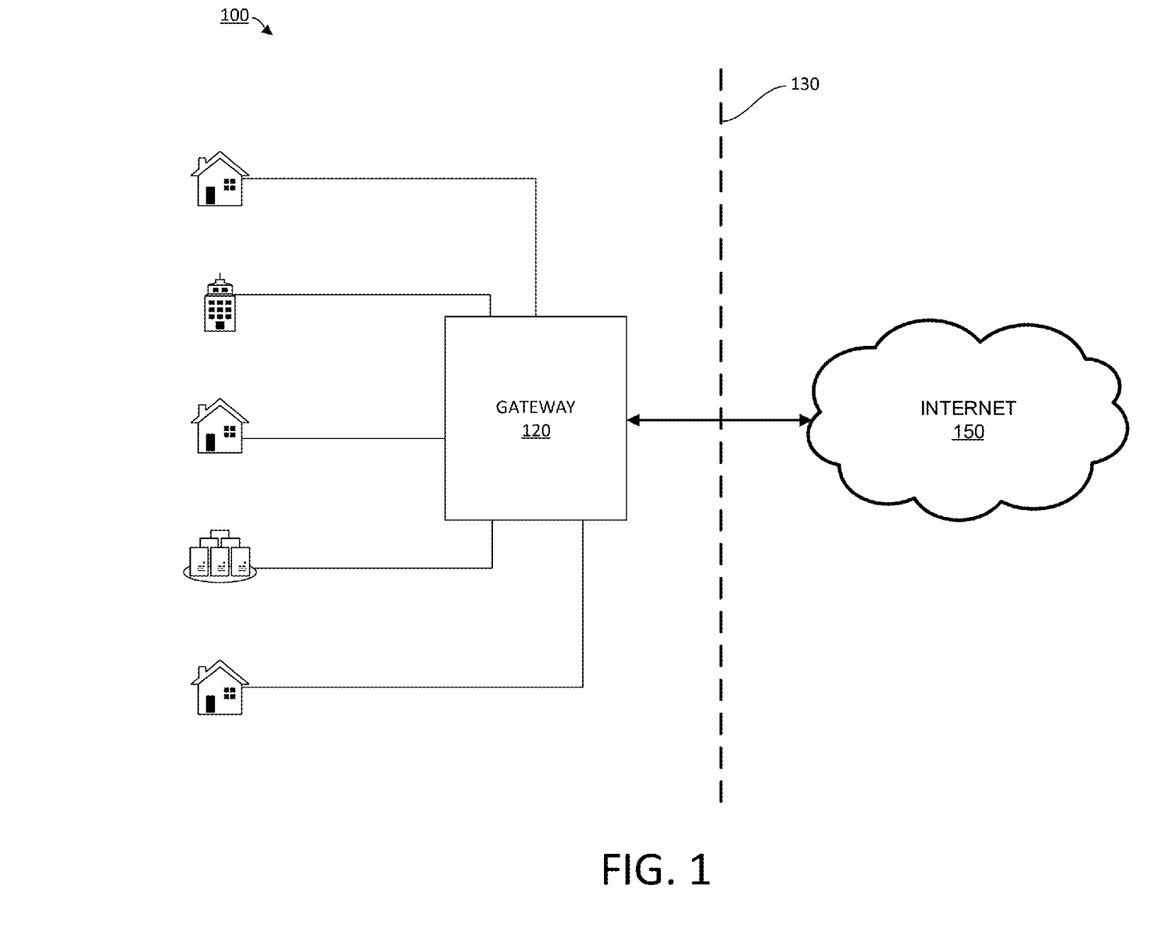
FIG. 1 illustrates an example traditional ISP network architecture.

Before describing the technology in detail, it may be helpful to describe an example ISP network architecture. FIG. 1 illustrates an example ISP network 100. Subscribers 110 connect to the network 100 through a network communication protocol. In various embodiments, the communication protocol implemented in the network 100 may be one of the various types of networking communication protocols known in the art, such as cable, DSL, dial-up, fiber-optic, or other hardwired access methods, or satellite broadband, Wi-Fi, WiMAX, mobile broadband, or other wireless access methods. The particular network communication protocol chosen may vary between ISPs. In some embodiments, the network 100 may include one or more of the different communication protocols.

Subscribers 110 may include residential, corporate, or governmental entities seeking Internet access. In various embodiments, the subscribers 110 could be seeking to connect various user devices to the Internet, including personal computers, laptops, televisions, gaming consoles, tablets, web-enabled cell phones, smartphones, web-enabled appliances, PDAs, servers, or any other web-enabled device.

A gateway 120 services multiple subscribers 110. All IP communication flows of the subscribers 110 to and from the Internet 150 is aggregated at the gateway 120. The gateway 120 serves as a point of presence (PoP) of the ISP. A PoP is an interface between the ISP's network and the Internet 150. In the example of FIG. 1, demarcation line 130 indicates the edge of the ISP's control.

The Internet Assigned Numbers Authority (IANA) is the organization responsible for Internet protocol (IP) addresses allocation. IANA divides the world into several regions, where a regional internet registry (RIR) manages the registration and allocation of the IP address ranges assigned to the covered region by the IANA. There are currently five (5) RIRs: the American Registry for Internet Numbers (ARIN); the African Network Information Centre (AfriNIC); the Asia-Pacific Network Information Centre (APNIC); the Latin America and Caribbean Network Information Centre (LACNIC); and the Réseaux IP Européens Network Coordination Centre (RIPE NCC). Each RIR delegates a range of IP addresses assigned to its given region, and may be further subdivided, based on geographic regions or individual countries.

An ISP applies to the RIR associated with the region in which the ISP plans to operate for a range of IP addresses on behalf of its customers. Generally, the IP addresses granted to and advertised by the ISP to its customers belong to the same region or country in which they are advertised. The ISP assigns a subnet of the IP address ranges allocated by the respective RIR to each gateway that provides the interface between the ISP network and the Internet. In FIG. 1, the gateway 120 may be assigned a range of IP addresses from a single RIR. The gateway 120 would include components for assigning an IP address to each subscriber 110 from the range of IP addresses available to the gateway 120. As the gateway 120 is typically located close to the subscribers 110, the IP address of the gateway 120 will also come from the same range. As such, the localization needs of the subscribers 110 are the same, and the IP address of the gateway 120 can function as the source IP address for IP protocol localization features without an issue.

Having thus described an example environment in which the disclosed technology can be implemented, various features and embodiments of the disclosed technology are now described in further detail. Description may be provided in terms of this example environment for ease of discussion and understanding. After reading the description herein, it will become apparent to one of ordinary skill in the art that the disclosed technology can be implemented in any of a number of different networking environments (including wired or wireless networking environments) operating with any of a number of different electronic devices, whether or not according to various similar or alternative protocols or specifications.

Some distribution technologies are capable of allowing ISPs to take advantage of economies of scale. Larger coverage distribution technologies—such as satellite broadband communications—increase the total coverage area of an ISP's network, enabling the ISP to service a greater number of subscribers over a larger geographic area. In addition, it is possible to employ larger aggregation points as these technologies are capable of providing quality of service (QoS) to more disparately located subscribers at or near the levels seen in the typical ISP network architecture illustrated in FIG. 1, where subscribers are serviced by a local gateway. In this way, ISPs are capable of expanding its coverage area into new geographic regions without the need to overly duplicate local gateway infrastructure; new subscribers in a different geographic area may be serviced by a gateway located a great distance away as easily as if the gateway was located near the subscriber.

Figure 2:
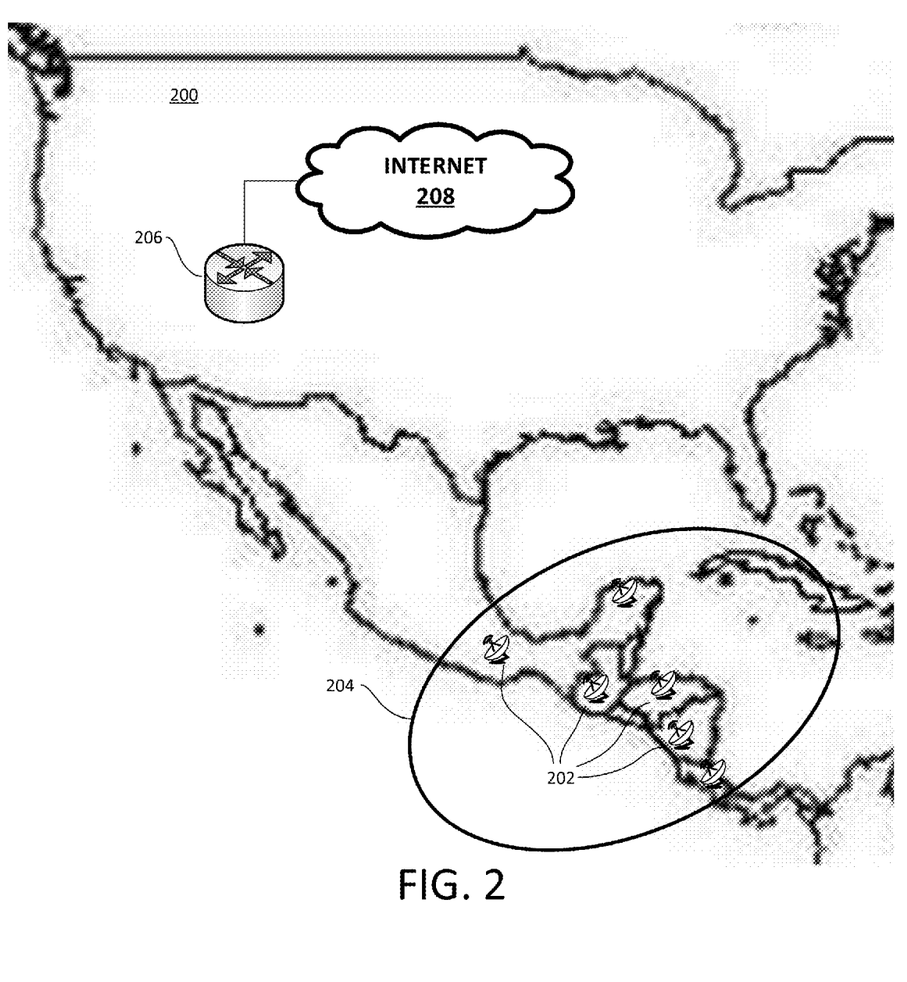
FIG. 2 illustrates an example network architecture of a large coverage distribution technology in accordance with the present disclosure.

FIG. 2 illustrates an example large distribution network 200 in accordance with the present disclosure. In FIG. 2, the large distribution network 200 is a satellite broadband network with coverage of Central America. Although described in regards to a satellite broadband communications network, the discussion should not be interpreted to limit the scope of the present disclosure. The technology described herein is applicable to any communication network where localization needs of all the subscribers are not the same, or where the gateway is not physically located near the subscribers serviced.

As illustrated in FIG. 2, a spot beam 204 of a communications satellite provides network service to subscribers 202 located in Mexico, Guatemala, Honduras, Nicaragua, and Costa Rica. The subscribers 202 access the Internet 208 through the gateway 206. As can be seen, the gateway 206 is not located near the subscribers, but is actually located within the United States. The RIR in charge of IP addresses in the United States is the American Registry for Internet Numbers (ARIN), and the RIR in charge of IP addresses in Central America is the Latin America and Caribbean Network Information Centre (LACNIC). Accordingly, the gateway 206 is servicing subscribers local to the gateway and within the same address range, as well as subscribers within a different range of IP addresses.

The scenario illustrated in FIG. 2 is increasingly likely with the increase in the use of high throughput satellites with multiple spot beam capability, as spot beams can provide greater levels of service as opposed to single beam, widefield satellite technologies. However, as discussed above, the source IP address utilized by the IP protocol is traditionally the IP address of the gateway aggregating and sending the subscribers' content requests to the Internet. In the traditional ISP network, this is not an issue as all the subscribers and the IP address of the gateway is associated with the location of the subscribers. Where a gateway is servicing subscribers not located in the same geographic area as the gateway, however, using the source IP address of the gateway will not provide the proper localization of content access.

Currently, systems utilizing high throughput satellites have avoided this problem in a number of ways. Some systems follow the traditional architecture, maintaining the servicing aggregation point close to the subscribers serviced. Some of the implementers of high throughput satellite maintain a private network serving finite number of similarly located customers. Finally, some systems simply ignore the impact of localization of servicing customers through a non-local gateway. Accordingly, implementers must either forego the economies of scale and maintain smaller aggregation points, or ignore the issue and fail to meet subscriber expectations and, potentially, provide the subscribers access to content that they otherwise are not allowed to access, based on either governing laws and regulations or restrictions imposed by the content provider or owner.

Figure 3:
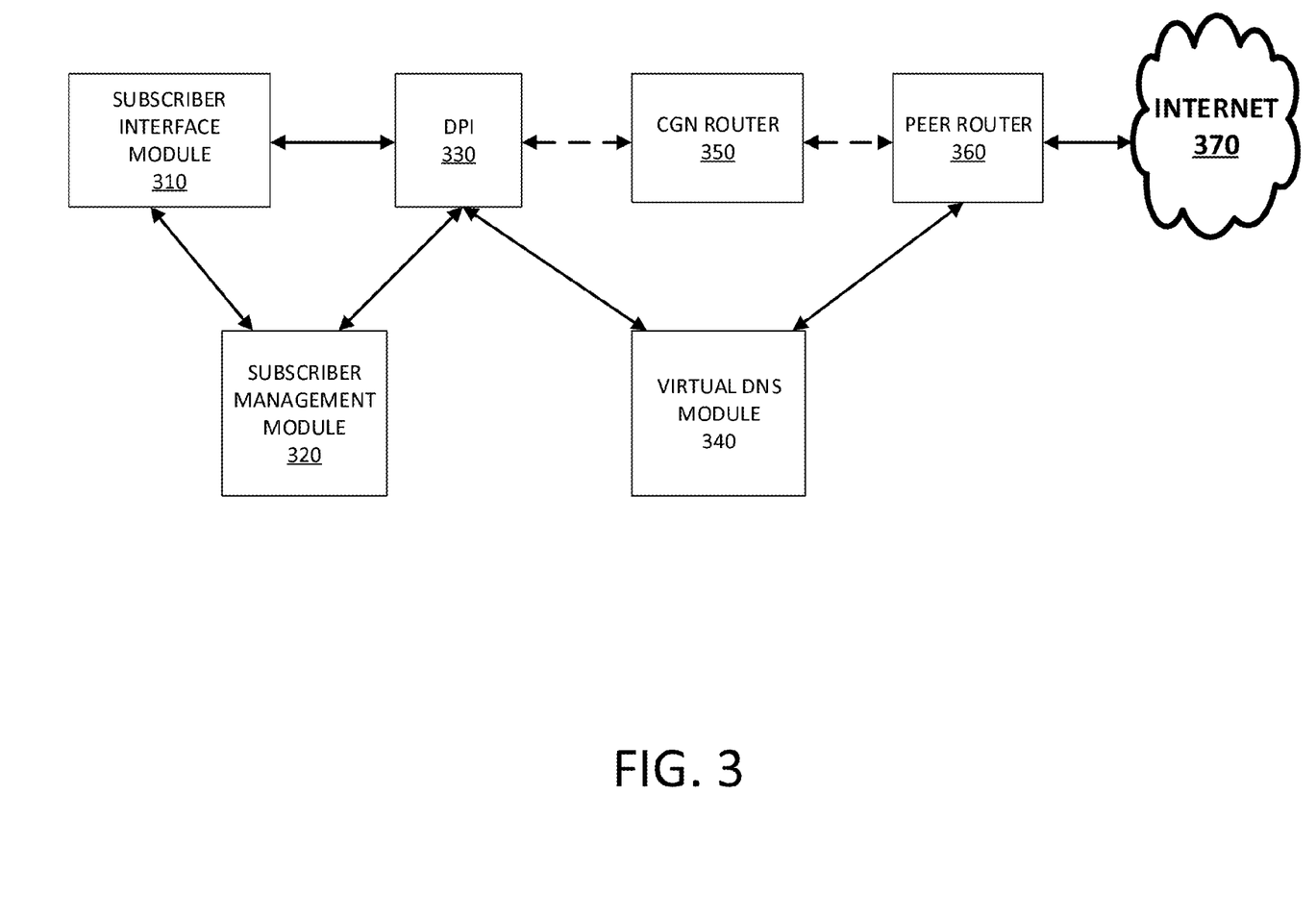
FIG. 3 illustrates an example context-aware gateway in accordance with the present disclosure.

To provide the benefits of localization in large coverage communications networks, a more sophisticated method of transmitting subscriber traffic to the Internet can be provided by various embodiments disclosed herein. FIG. 3 illustrates an example context-aware gateway 300 in accordance with the present disclosure. In various embodiments, the context-aware gateway 300 may service subscribers located throughout several different geographic areas, as illustrated in FIG. 2. In various embodiments, the context-aware gateway 300 may be located in one geographic area, but servicing subscribers located in a second geographic area. In some embodiments, the context-aware gateway 300 may be located in the same geographic area as a first set of subscribers, but may also service a second set of subscribers located in one or more different geographic areas.

To provide service to subscribers located in different geographic areas, the context-aware gateway 300 maintains or can otherwise access and utilize one or more IP address ranges registered to the ISP. Each of the IP address ranges is associated with a geographic area. As discussed above, the ISP obtains IP addresses for use in its network from the RIR in charge of the region in which the ISP is operating. In some embodiments, more than one IP address range may be associated with a particular geographic area. For example, two non-consecutive IP address ranges available to the context-aware gateway 300 may be associated with the same geographic area, while an IP address range falling within the two non-consecutive IP address ranges may be associated with a second geographic area. In some embodiments, at least one of the IP address ranges available to the context-aware gateway 300 is associated with a RIR different from the other IP address ranges. In some embodiments, the context-aware gateway 300 may only have available IP address ranges managed by a single RIR, but at least one of the IP address ranges is associated with an identifiable area within the RIR's management region. In some embodiments, the identifiable area may be a country or a subset of a country—such as a state, province, municipality, or other designated area—or a definable section of the RIR's management region.

The context-aware gateway 300 may be configured to assign to each subscriber an IP address associated with the geographic region in which the subscriber is located. By assigning IP addresses based on the location of the subscriber, the context-aware gateway 300 is capable of identifying the geographic area from which a subscriber request is received in order to ensure that any localization needs are met. A description of an example IP assignment process is discussed below with reference to FIG. 4.

In various embodiments, the context-aware gateway 300 may include a subscriber management module 320. In various embodiments, the subscriber management module 320 may provide management functions to the context-aware gateway 300 such that the localization needs of each subscriber are provided. In various embodiments, the subscriber management module 320 may maintain an association list of the IP address ranges and its associated geographic area. In this way, the context-aware gateway 300 is capable of identifying the geographic area within which a subscriber is located.

In some embodiments, the subscriber management module 320 may maintain the list of IP address ranges in a memory component locally at the context-aware gateway 300. In some embodiments, the subscriber management module 320 may be communicatively coupled to a network administrator and the association list is stored at the network administrator. When the context-aware gateway 300 receives a request, the subscriber management module 320 may query the network administrator to retrieve the geographic area associated with the subscriber.

In various embodiments, the subscriber management module 320 may maintain one or more geographic area-specific policies. Each geographic area serviced by the context-aware gateway 300 may have its own policy on the type of content available within the geographic area and the particular localization needs of subscribers within the geographic area. In some embodiments, the geographic area-specific policy may include one or more location-specific rules regarding the language in which content should be retrieved, the ideal transmission speed for the geographic area, and/or which domain name server (DNS) to query. In some embodiments, the geographic area-specific policy may include one or more location-specific rules designed to enforce governing laws or regulations within the geographic area regarding the type of content that may be accessed by a subscriber. In various embodiments, the geographic area-specific policy may include one or more location-specific rules designed to enforce licensing and access rules implemented by the content provider or owner. In some embodiments, one or more of the above described location-specific rules may be included within the geographic area-specific policy for a given geographic area serviced by the context-aware gateway 300.

In some embodiments, the subscriber management module 320 may also hold subscriber service policies, identifying the level of ISP service for which the subscriber has paid. For example, some ISPs offer multiple tiers of service, each with different transmission speeds. In some embodiments, the subscriber management module 320 may maintain an association between the subscriber and the subscriber's service plan.

In various embodiments, the context-aware gateway 300 may include a subscriber interface module 310. The subscriber interface module 310 provides a communication interface between each subscriber serviced by the context-aware gateway 300. In some embodiments, the subscriber interface module 310 may include broadband processing equipment for converting data signals to and from the context-aware gateway 300 for wireless transmission. In some embodiments, the subscriber interface module 310 may include connections for wired communications. In some embodiments, the subscriber interface module may be capable of both wired and wireless communication, thereby having components for both wireless and wired communications processing.

The context-aware gateway 300 may assign to each subscriber an IP address associated with the geographic region in which the subscriber is located. By assigning IP addresses based on the location of the subscriber, the context-aware gateway 300 is capable of identifying the geographic area from which a subscriber request is received in order to ensure that any localization needs are met. A description of an example IP assignment process is discussed below with reference to FIG. 4. In some embodiments, the subscriber interface module 310 performs assignment of IP addresses to each subscriber when the subscriber joins the network. The subscriber interface module 310 is communicatively coupled to the subscriber management module. In some embodiments, the subscriber interface module 310 communicates with the subscriber management module 320 to assign an IP address to a subscriber. In other embodiments, the subscriber management module 320 may perform the assignment function.

The illustrated example the context-aware gateway 300 may include a deep packet inspection (DPI) module 330. The DPI module 330 inspects the Internet traffic flowing through the context-aware gateway 300 and shapes subscriber traffic requests based on the particular geographic area-specific policy that is applicable. In some embodiments, the DPI module 330 is communicatively coupled to the subscriber management module 320 and the subscriber interface module 310. In some embodiments, when a subscriber traffic request is received by the subscriber interface module 310, it is inspected by the DPI module 330 for ensure compliance with the IP protocol, and the DPI module 330 applies the geographic area-specific policy applicable to the subscriber. In such embodiments, the DPI module 330 may communicate with the subscriber management module 320 to obtain the geographic area-specific policy applicable to the subscriber. In some embodiments, the DPI module 330 may send the IP address of the requesting subscriber to the subscriber management module 320, which identifies the geographic area associated with the IP address and returns the applicable policy. In some embodiments, the DPI module 330 may receive an identification of the geographic area where the requesting subscriber is located and query the subscriber management module 320 for the geographic area-specific policy for that area.

Although illustrated in FIG. 3 as communicatively coupled to the subscriber interface module 310 and the subscriber management module 320, in some embodiments the DPI module 330 may be communicatively coupled to only one or the other of the modules. In such embodiments, the DPI module 330 may receive the request and the applicable geographic area-specific policy at the same time, without the need to query either the subscriber interface module 310 or the subscriber management module 320.

In various embodiments, the context-aware gateway 300 may include a virtual DNS module 340. The virtual DNS module 340 may maintain a plurality of virtual DNS servers, one or more of the virtual DNS servers associated with each geographic area serviced by the context-aware gateway 300. In various embodiments, the virtual DNS module 340 may be one or more local DNS servers with a plurality of partitions to create virtual DNS servers.

By providing a plurality of virtual DNS servers, the context-aware gateway may be configured in various embodiments to introduce additional sophistication into the reconciliation of a subscriber's request, above merely using an IP address associated with the subscribers' locations. In some situations, localization is not a necessity to meet subscriber expectations because the content itself is location agnostic. In such cases, it may be beneficial to use as the source IP address an IP address associated with the geographic area of the gateway, thereby limiting the number of hops the request must travel to retrieve the content.

Accordingly, in some embodiments, the context-aware gateway 300 may determine the type of content requested by the subscriber and, based on both the geographic area-specific policy and the context of the request, determine an appropriate source IP address to use in reconciling the request. In this manner, the context-aware gateway 300 can provide localized content when necessary by reconciling the request using a virtual DNS associated with the geographic area of the subscriber. When no localization is required, however, the context-aware gateway 300 may use a virtual DNS associated with the geographic area of the context-aware gateway 300 to ensure fast reconciliation speed by using content-distribution networks (CDN) local to the gateway.

In various embodiments, the context-aware gateway 300 may include a carrier-grade network address translator (CGN) router 350. A CGN router 350 can be included to mitigate IPv4 address exhaustion. IPv4 address exhaustion is the depletion of the pool of available unallocated IPv4 addresses. The CGN router 350 translates a private IPv4 address used in a private network, such as an ISP network, into a public IPv4 address. This allows the ISP to provide additional subscribers access to the network where it does not have a sufficient number of allocated public IP addresses. In various embodiments, a CGN router 350 may be included to address private addressing within the network. In some embodiments, a CGN router 350 may not be needed because the ISP either does not utilize private inter-network addressing, or the ISP network only utilizes IPv6 protocol. In FIG. 3, the connection between the CGN router 350 and the other modules of the context-aware gateway 300 is shown as a broken line, to indicate the optional nature of the CGN router 350.

In various embodiments, the context-aware gateway 300 may include a peer router 360. Peering is a voluntary interconnection of administratively separate Internet networks to allow for the exchange of data between the networks. The peer router 360 provides a communication interface between the context-aware gateway 300 to other autonomous systems making up the Internet. In various embodiments, the peer router 360 may be configured to exchange control information using the border gateway protocol (BGP). The BGP is a standardized protocol for external communication between a network gateway and other networks. In some embodiments, the internal routing of the network may also implement BGP. In such embodiments, the context-aware gateway 300 may include an internal BGP router to communicate with other gateways within the network.

As discussed above, the technology of the present disclosure enables an ISP to determine the appropriate source IP address to utilize in reconciling a subscriber's request where a network gateway is servicing ISP subscribers from different geographic areas, with different localization needs. By associating one or more IP address ranges available to the gateway with a geographic area serviced by the gateway, the ISP may determine the appropriate source IP address to use to ensure that the IP protocol's localization features are effective and also allowing the enforcement of content access rules and regulations of governments and content providers/owners.

Figure 4:
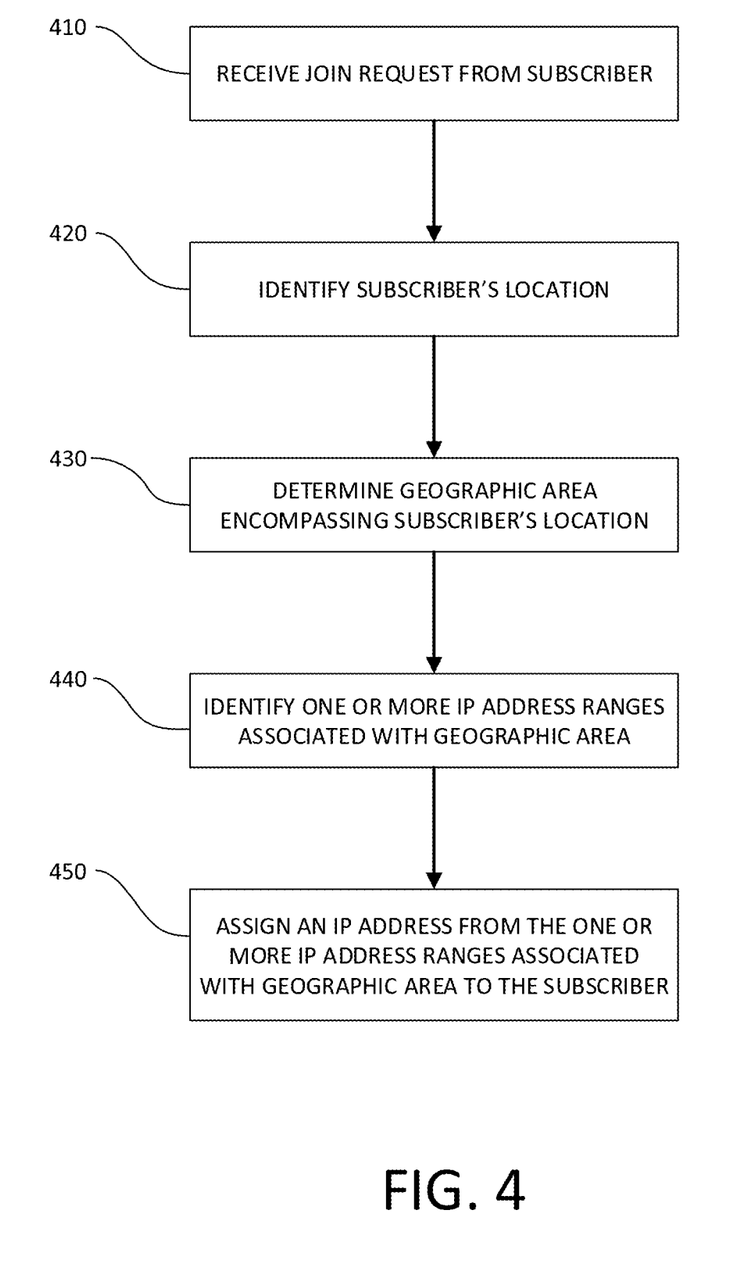
FIG. 4 is a flow diagram of an example process of assigning an IP address associated with a particular geographic area to a subscriber located within that geographic area in accordance with the present disclosure.

To identify the geographic area encompassing the subscriber's location, the servicing gateway assigns an associated IP address to each subscriber in a given geographic region when the subscriber connects to the gateway. FIG. 4 is a process flow diagram illustrating an example assignment process in accordance with the present disclosure. At operation 410, the servicing gateway receives a join request to join the network from a subscriber. In various embodiments, the servicing gateway may be similar to the context-aware gateway 300 discussed above with regards to FIG. 3. In some embodiments in which the context-aware gateway 300 is implemented, the system can be configured such that the subscriber interface module 310 or the subscriber management module 320 may perform the assignment process. In other embodiments in which the context-aware gateway 300 is implemented, the subscriber interface module 310 and the subscriber management module 320 may communicate together and perform the assignment process.

At operation 420, the servicing gateway identifies the subscriber's location. In order to provide an IP address associated with the correct geographic area for the subscriber, the servicing gateway can be configured to use locating data identifying where on the globe the subscriber is located. This locating data can be obtained from a variety of sources. In some cases, the join request from the subscriber may contain the locating data used by the servicing gateway. For example, the network connection equipment at the subscriber's location may be connected to a GPS receiver or other location-determination device, and the join request may contain an indication from the GPS receiver of the subscriber's location. As another example, the network connection equipment at the subscriber's location may be hardwired with latitude and longitude coordinates identifying the subscriber's approximate location. Alternatively, the system may be configured to allow the subscriber to enter an address identifying where the subscriber is to receive service, and this information may be sent to the servicing gateway in the join request.

In other cases, the join request may include an indication of the subscriber, which the servicing gateway may send to a network administrator to obtain the subscriber's location that is on file. In such embodiments, the indication of the subscriber may include information such as, for example: the subscriber's name; the subscriber's account number; the subscriber's phone number; or other information identifying the subscriber.

At operation 430, the servicing gateway determines the geographic area encompassing the subscriber's location. By determining the geographic area, the servicing gateway can ensure that the IP address assigned to the subscriber is one associated to that geographic area. In some embodiments, the geographic area may be one of: a region managed by an RIR; a country; a state; a province; a municipality; or any other definable sub-area of those areas.

For example, in some embodiments the subscriber management module may receive the join request from the subscriber interface module. The subscriber management module can parse the locating data from the join request. In some embodiments, the subscriber management module may create and send a communication request from the servicing gateway to the Internet requesting additional information regarding the location of the subscriber based on the locating data. Other example embodiments may include a listing of areas tailored to the type of locating data utilized by the subscriber's connection equipment in the ISP's network. In such cases, the subscriber management module may be able to identify the subscriber's location by locating, for example, the latitudinal and longitudinal boundaries of an area and determining if the coordinates transmitted by the connection equipment falls within those boundaries. In still other embodiments, the subscriber management module (or subscriber interface module) may transmit the parsed locating data to a network administrator, who can use the locating data to identify the subscriber's geographic area and transmit that information back to the servicing gateway.

At operation 440, the servicing gateway identifies one or more IP address ranges available to the servicing gateway associated with the geographic area. As discussed above, one or more IP address ranges may be associated with a particular geographic area. In various embodiments, the subscriber management module may locate the one or more IP address ranges for the geographic area associated with the subscriber's location. During the assignment process, addresses previously assigned and/or currently in use may be tagged to ensure that multiple subscribers are not assigned the same IP address, as this would cause major communication issues.

At operation 450, the servicing gateway assigns the subscriber with an IP address from an IP address range associated with that geographic area. As discussed above with regard to the context-aware gateway 300 of FIG. 3, a servicing gateway may service subscribers from many different geographic areas, and more than one IP address range available to the servicing gateway may be associated with each geographic area. After assigning the IP address, the servicing gateway may tag, flag, or otherwise identify that the IP address has been assigned to the subscriber.

Figure 5:
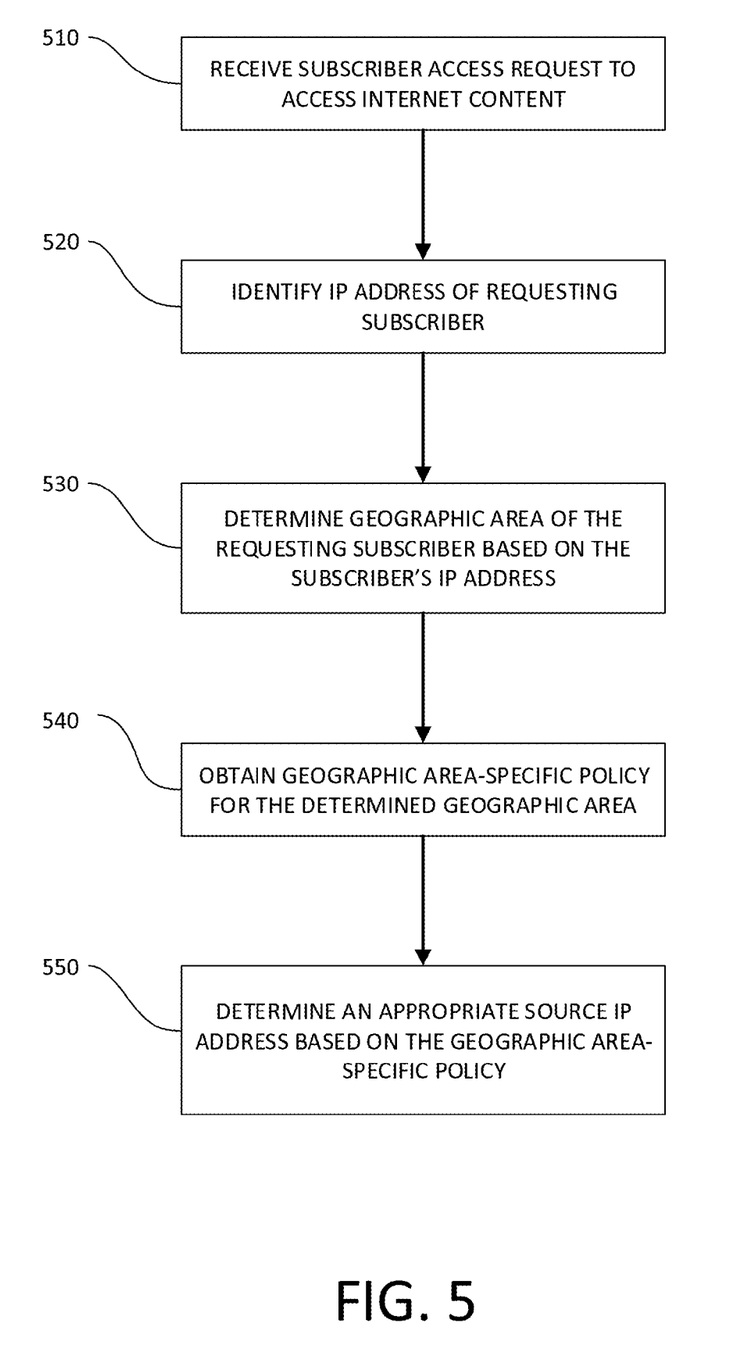
FIG. 5 is a flow diagram of an example process for identifying the appropriate source IP address to use in reconciling a subscriber request in accordance with the present disclosure.

By enabling the servicing gateway to identify the geographic area where a subscriber is located, the ISP can be used to provide sophisticated request reconciliation, as discussed above with reference to FIG. 3. One example process flow for identifying the appropriate source IP address to use in reconciling a subscriber request in accordance with the present disclosure is illustrated in FIG. 5. For ease of discussion, the process flow of FIG. 5 is discussed with reference to the context-aware gateway 300 of FIG. 3. However, after reading this description, one of ordinary skill in the art will understand how this process can be implemented using an alternative gateway configuration. The present disclosure is applicable to other embodiments of servicing gateways including greater or fewer modules.

At operation 510, a subscriber access request is received by the context-aware gateway. The subscriber access request identifies the requesting subscriber based on the subscriber's assigned IP address. At operation 520, the context-aware gateway identifies the IP address assigned to the subscriber. In some embodiments, the subscriber interface module may identify the IP address when it receives the subscriber access request. In some embodiments, the subscriber management module may receive the subscriber access request from the subscriber interface module and perform the identification.

At operation 530, the context-aware gateway determines the geographic area of the requesting subscriber based on the identified IP address. As discussed above, the IP address assigned to a subscriber is associated with a particular geographic area. In some embodiments, the subscriber interface module may query the subscriber management module for the geographic area associated with the IP address. In some embodiments, the subscriber management module may perform both the identification of the IP address and the determination of the associated geographic area.

At operation 540, the context-aware gateway obtains the geographic area-specific policy associated with the determined geographic area. In some embodiments, the DPI module may perform the obtaining. In some embodiments, the DPI module may query the subscriber management module 320 for the geographic area-specific policy applicable to the subscriber's request. In various embodiments, the DPI module may receive both the subscriber's access request and the geographic area-specific policy from the subscriber management module, or the subscriber interface module.

At operation 550, the context-aware gateway determines an appropriate source IP address to use in reconciling the subscriber's access request based on the geographic area-specific policy. In some embodiments, the determination may be made by the subscriber management module. In various embodiments, the DPI module may determine the appropriate source IP address. In some embodiments, the virtual DNS module may determine the appropriate source IP address.

Based on the determination of the appropriate source IP address, the communication request may be routed correctly such that the localization features of the IP protocol will identify the subscriber's geographic area, as opposed to the gateway's geographic area. If the geographic area-specific policy identifies that the request must be sourced locally, the servicing gateway may route the subscriber's request through the proper virtual DNS server, having an IP address associated with the same geographic area as the subscriber. In this way, the source IP address seen by the IP protocol is one indicating the subscriber's geographic area.

Figure 6:
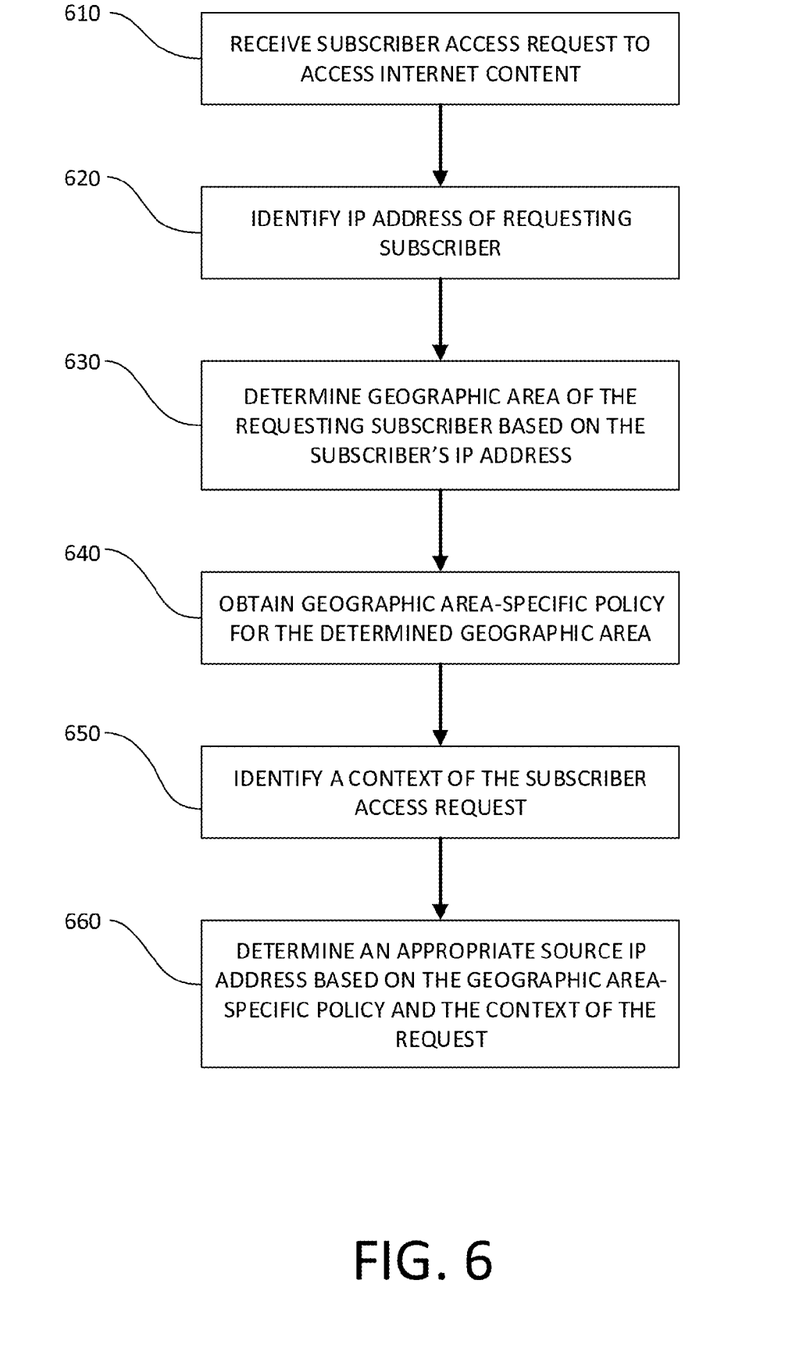
FIG. 6 is a flow diagram of another example process for identifying the appropriate source IP address to use in reconciling a subscriber request in accordance with the present disclosure.

In some cases, a more sophisticated determination of the appropriate source IP address is beneficial, and can be used to ensure that content which is localization agnostic is retrieved in the fastest possible manner. FIG. 6 illustrates an example of determining the appropriate source IP address to utilize in reconciling a subscriber access request in accordance with the present disclosure. In some embodiments, the process flows 610-640 may be similar to the process flows 510-540 discussed above with reference to FIG. 5.

At operation 650, a context of the subscriber access request is identified. In some embodiments, the context of the subscriber access request may be the type of content the requesting subscriber is attempting to access. For example, the context of a subscriber access request may be a video that the subscriber wants to stream from a hosting website. In another example, the context may be a website that has different content versions specified for different geographic areas, such as Google™. In the first example, whether the video is streamed from a CDN that contains other content that meets the localization needs of the subscriber may be immaterial. If the subscriber has the permission to stream such a video, the video file could be retrieved faster by using a CDN that is local to the gateway (i.e., that is accessible using the an IP address associated with the geographic area of the gateway as the source IP address). In the latter example, however, it is important to provide the expected version of the Google homepage, so that the subscriber's search results will include local results. If a subscriber in Brazil is searching for an automotive repair shop, it is not helpful if the results are tied to a source IP address identifying the United States as the originator of the request.

At operation 660, the context-aware gateway determines the appropriate source IP address based on both the geographic area-specific policy and the context of the subscriber's access request. An example of this determination is illustrated in greater detail in FIG. 7. Unlike the example process illustrated in FIG. 5, the determination of the appropriate IP address at operation 660 does not strictly determine which geographic area the subscriber is located, but also whether localization is needed at all based on the context of the request and the associated policy.

Figure 7:
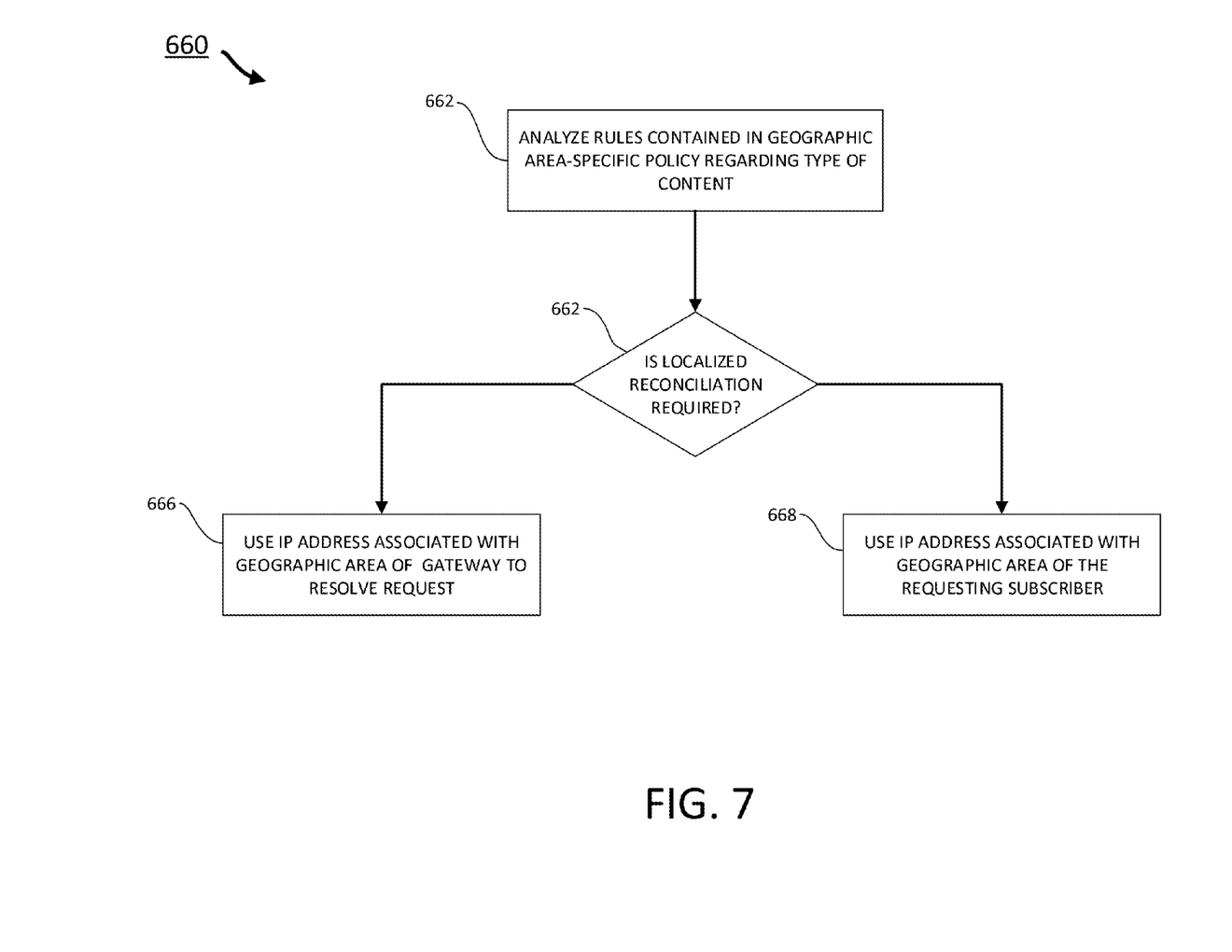
FIG. 7 is a flow diagram illustrating the determination of the appropriate source IP address to use in reconciling a subscriber request of the process of FIG. 6, in accordance with the present disclosure.

As illustrated in FIG. 7, at operation 662 the context-aware gateway analyzes the rules contained in the geographic area-specific policy relevant to the particular context of the request. Referring to the examples discussed above, a subscriber looking to stream a video will expect the webpage contents to arrive in the proper language and the delivered version of the video to be compatible with the subscriber's location. However, when it comes to streaming the actual video, the important thing is not necessarily whether the video is sourced locally to the subscriber, i.e. from a CDN local to the subscriber), but whether the video file is retrieved fast enough to ensure a smooth stream. For the search engine example, however, it is important to provide the local version of Google so that the subscriber's results are relevant to the geographic area in which the subscriber is located.

The context-aware gateway can be configured to use this information to determine whether localized reconciliation of the request is required at 662. In other words, the context-aware gateway can determine whether it needs to source the subscriber access request using an IP address associated with the geographic area of the subscriber (668) or if it would be better to source the request using an IP address associated with its own geographic area (666). The fewer hops that are required through the Internet to retrieve information, the faster the gateway is able to provide the information to the subscriber. The headers of the communication request may be modified to ensure that the request is routed through the proper virtual DNS server.

In various embodiments, additional gateway equipment may be implemented within an ISP's network to aggregate subscriber flows, which may or may not be collocated with a context-aware gateway in accordance with the present disclosure. Such additional gateway equipment is focused on aggregating subscriber traffic within the system, but does not act as a PoP of the network to the Internet. The technology disclosed herein is concerned with providing a context-aware gateway serving as a PoP of the ISP's network that is located in a country or region that is different than one or more of the subscribers whose data is being aggregated to and from the Internet.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 8:
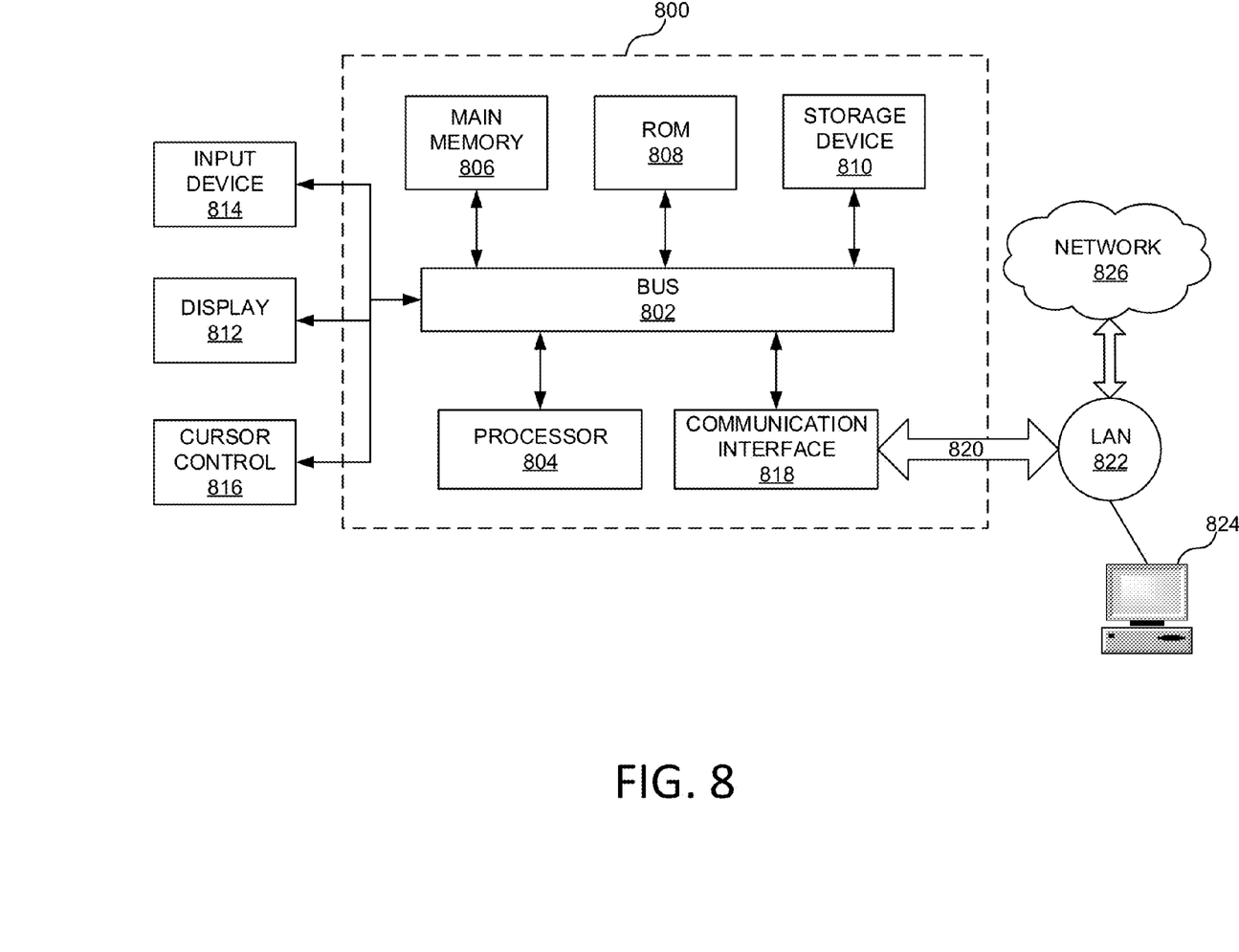
FIG. 8 is an example computing module that may be used in implementing various features of embodiments of the disclosed technology.

FIG. 8 illustrates a computer system 800 upon which example embodiments according to the present invention can be implemented. Computer system 800 can include a bus 802 or other communication mechanism for communicating information, and a processor 804 coupled to bus 802 for processing information. Computer system 800 may also include main memory 806, such as a random access memory (RAM) or other dynamic storage device, coupled to bus 802 for storing information and instructions to be executed by processor 804. Main memory 806 can also be used for storing temporary variables or other intermediate information during execution of instructions to be executed by processor 804. Computer system 800 may further include a read only memory (ROM) 808 or other static storage device coupled to bus 802 for storing static information and instructions for processor 804. A storage device 810, such as a magnetic disk or optical disk, may additionally be coupled to bus 802 for storing information and instructions.

Computer system 800 can be coupled via bus 802 to a display 812, such as a cathode ray tube (CRT), liquid crystal display (LCD), active matrix display, light emitting diode (LED)/organic LED (OLED) display, digital light processing (DLP) display, or plasma display, for displaying information to a computer user. An input device 814, such as a keyboard including alphanumeric and other keys, may be coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812.

According to one embodiment of the invention, dynamic bandwidth management, in accordance with example embodiments, are provided by computer system 800 in response to processor 804 executing an arrangement of instructions contained in main memory 806. Such instructions can be read into main memory 806 from another computer-readable medium, such as storage device 810. Execution of the arrangement of instructions contained in main memory 806 causes processor 804 to perform one or more processes described herein. One or more processors in a multiprocessing arrangement may also be employed to execute the instructions contained in main memory 806. In alternative embodiments, hard-wired circuitry is used in place of or in combination with software instructions to implement various embodiments. Thus, embodiments described in the present disclosure are not limited to any specific combination of hardware circuitry and software.

Computer system 800 may also include a communication interface 818 coupled to bus 802. Communication interface 818 can provide a two-way data communication coupling to a network link 820 connected to a local network 822. By way of example, communication interface 818 may be a digital subscriber line (DSL) card or modem, an integrated services digital network (ISDN) card, a cable modem, or a telephone modem to provide a data communication connection to a corresponding type of telephone line. As another example, communication interface 818 may be a local area network (LAN) card (e.g. for Ethernet™ or an Asynchronous Transfer Model (ATM) network) to provide a data communication connection to a compatible LAN. Wireless links can also be implemented. In any such implementation, communication interface 818 sends and receives electrical, electromagnetic, or optical signals that carry digital data streams representing various types of information. Further, communication interface 818 may include peripheral interface devices, such as a Universal Serial Bus (USB) interface, a PCMCIA (Personal Computer Memory Card International Association) interface, etc.

Network link 820 typically provides data communication through one or more networks to other data devices. By way of example, network link 820 can provide a connection through local network 822 to a host computer 824, which has connectivity to a network 826 (e.g. a wide area network (WAN) or the global packet data communication network now commonly referred to as the "Internet") or to data equipment operated by service provider. Local network 822 and network 826 may both use electrical, electromagnetic, or optical signals to convey information and instructions. The signals through the various networks and the signals on network link 820 and through communication interface 818, which communicate digital data with computer system 800, are example forms of carrier waves bearing the information and instructions.

Computer system 800 may send messages and receive data, including program code, through the network(s), network link 820, and communication interface 818. In the Internet example, a server (not shown) might transmit requested code belonging to an application program for implementing an embodiment of the present invention through network 826, local network 822 and communication interface 818. Processor 804 executes the transmitted code while being received and/or store the code in storage device 810, or other non-volatile storage for later execution. In this manner, computer system 800 obtains application code in the form of a carrier wave.

The term "computer-readable medium" as used herein refers to any medium that participates in providing instructions to processor 804 for execution. Such a medium may take many forms, including but not limited to non-volatile media, volatile media, and transmission media. Non-volatile media include, for example, optical or magnetic disks, such as storage device 810. Volatile media may include dynamic memory, such as main memory 806. Transmission media may include coaxial cables, copper wire and fiber optics, including the wires that comprise bus 802. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 9:
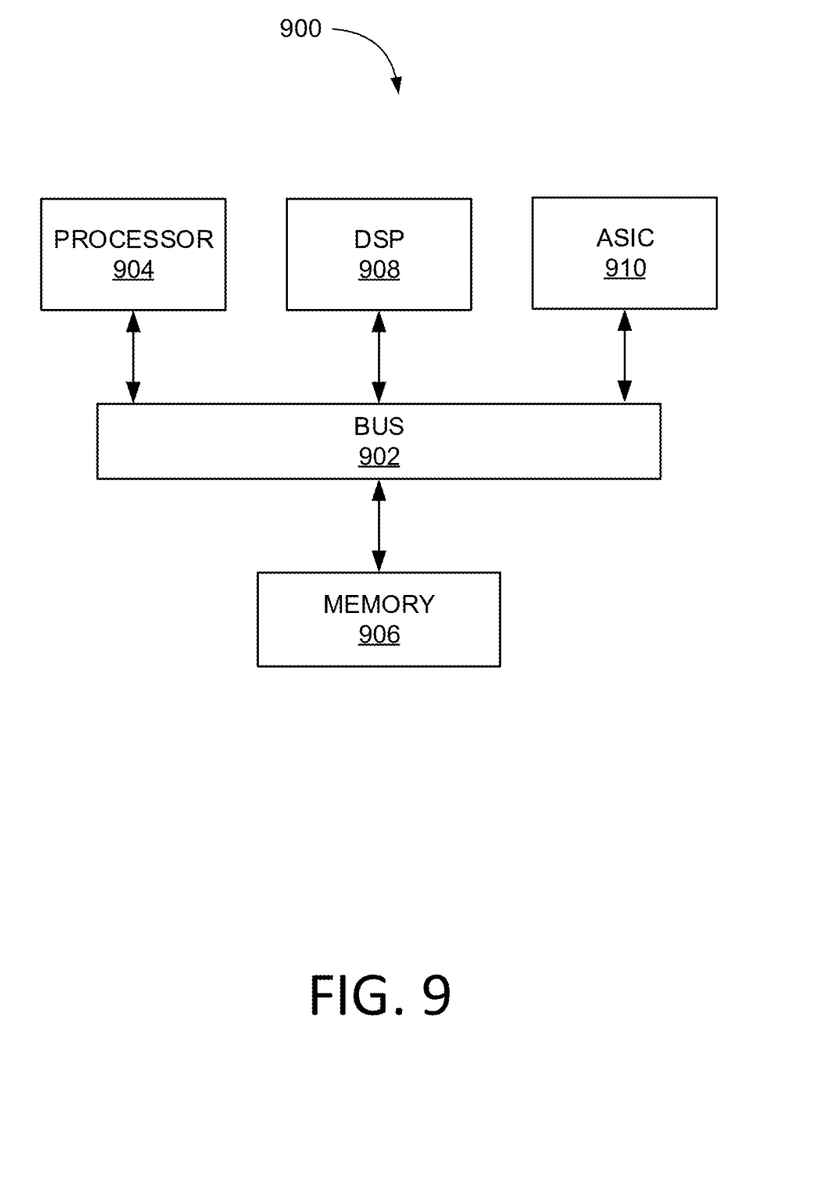
FIG. 9 illustrates an example chip set that can be utilized in implementing architectures and methods for dynamic bandwidth allocation in accordance with various embodiments The figures are not intended to be exhaustive or to limit the invention to the precise form disclosed. It should be understood that the invention can be practiced with modification and alteration, and that the disclosed technology be limited only by the claims and the equivalents thereof.

FIG. 9 illustrates a chip set 900 in which embodiments of the invention may be implemented. Chip set 900 can include, for instance, processor and memory components described with respect to FIG. 9 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 900 includes a communication mechanism such as a bus 902 for passing information among the components of the chip set 900. A processor 904 has connectivity to bus 902 to execute instructions and process information stored in a memory 906. Processor 904 includes one or more processing cores with each core configured to perform independently. A multi-core processor enables multiprocessing within a single physical package. Examples of a multi-core processor include two, four, eight, or greater numbers of processing cores. Alternatively or in addition, processor 904 includes one or more microprocessors configured in tandem via bus 902 to enable independent execution of instructions, pipelining, and multithreading. Processor 904 may also be accompanied with one or more specialized components to perform certain processing functions and tasks such as one or more digital signal processors (DSP) 908, and/or one or more application-specific integrated circuits (ASIC) 910. DSP 908 can typically be configured to process real-world signals (e.g., sound) in real time independently of processor 904. Similarly, ASIC 910 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 904 and accompanying components have connectivity to the memory 906 via bus 902. Memory 906 includes both dynamic memory (e.g., RAM) and static memory (e.g., ROM) for storing executable instructions that, when executed by processor 904, DSP 908, and/or ASIC 910, perform the process of example embodiments as described herein. Memory 906 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the application using other computing modules or architectures.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

What is claimed is:

1. A gateway, comprising:
   one or more non-transitory computer-readable mediums operatively coupled to one or more processors, and having instructions stored thereon that, when executed by the one or more processors, cause the gateway to:
   receive requests from a plurality of subscribers serviced by the gateway;
   maintain an association list and one or more geographic area-specific policies;
   determine a geographic area of a subscriber from which a request was received, wherein the geographic area of the subscriber is determined based on the IP address of the subscriber;
   determine an appropriate source IP address to use in servicing the request based on a geographic area-specific policy for the determined geographic area; and
   maintain a plurality of virtual DNS servers,
   wherein one or more IP address ranges are available for use by the gateway, and wherein the gateway services at least one subscriber that is located in a different geographic area than the gateway.

2. The gateway of claim 1, wherein the association list comprises an identification of one or more IP address ranges associated with each geographic area serviced by the gateway.

3. The gateway of claim 1, wherein the instructions, when executed by the one or more processors, further cause the gateway to apply a geographic area-specific policy associated with the determined geographic area of the subscriber.

4. The gateway of claim 3, wherein the instructions, when executed by the one or more processors, further cause the gateway to query for a geographic area-specific policy associated with the determined geographic area of the subscriber.

5. The gateway of claim 1, wherein the gateway is communicatively coupled to a network administrator.

6. The gateway of claim 1, further comprising a peer router configured to transmit IP protocol-formatted packets to one or more autonomous systems comprising a third-party network.

7. The gateway of claim 6, wherein the peer router is configured to broadcast the IP address ranges available for use by the gateway, wherein at least one IP address range is associated with a geographic area different from a geographic area of the gateway.

8. A method of determining routing for a communication request based on an originating location of a request, comprising:
   a gateway receiving a request from a requesting subscriber to access Internet content;
   the gateway identifying an IP address of the requesting subscriber;
   the gateway determining a geographic area of the requesting subscriber based on the IP address;
   the gateway obtaining a geographic area-specific policy for the determined geographic area; and
   the gateway determining an appropriate source IP address to use in servicing the request based on the geographic area-specific policy.

9. The method of claim 8, wherein the gateway maintains one or more geographic area-specific policies and one or more IP address ranges associated with each geographic area serviced by the gateway.

10. The method of claim 9, wherein obtaining one or more geographic area-specific policies comprises the gateway locating the geographic area-specific policy for the determined geographic area based on the IP address of the requesting subscriber.

11. The method of claim 10, wherein the geographic area comprises a state, province, or other identifiable area within the borders of a country or region associated with a regional Internet registry organization.

12. The method of claim 8, wherein receiving a request from a requesting subscriber comprises receiving a request over a communications protocol.

13. The method of claim 12, wherein the communications protocol comprises a wired communications protocol, the wired communications protocol comprising one of: cable; DSL; dial-up; or fiber-optic.

14. The method of claim 12, wherein the communications protocol comprises a wireless communications protocol, the wireless communications protocol comprising one of: satellite broadband; Wi-Fi; WiMAX; or mobile broadband.

15. The method of claim 8, wherein determining an appropriate source IP address to use in servicing the request based on the geographic area-specific policy comprises determining whether the geographic area of the requesting subscriber is the same geographic area as a geographic area of the gateway.

16. The method of claim 15, wherein, if the geographic area of the requesting subscriber is the same geographic area as the geographic area of the gateway, using an IP address associated with the gateway as the appropriate source IP address.

17. The method of claim 15, wherein, if the geographic area of the requesting subscriber is different from the geographic area of the gateway, using an IP address associated with the geographic area of the requesting subscriber as the appropriate source IP address.

18. The method of claim 15, wherein the gateway comprises a virtual DNS module including a plurality of virtual DNS servers, and wherein one or more of the plurality of virtual DNS servers is associated with each geographic area serviced by the gateway.

19. The method of claim 18, wherein, if the geographic area of the requesting subscriber is the same geographic area as the geographic area of the gateway, using an IP address of a virtual DNS server associated with the geographic area of the gateway as the appropriate source IP address.

20. The method of claim 18, wherein, if the geographic area of the requesting subscriber is different from the geographic area of the gateway, using an IP address of a virtual DNS server associated with the geographic area of the requesting subscriber as the appropriate source IP address.

21. The method of claim 8, further comprising:
the gateway identifying a context of the request from the requesting subscriber; and
the gateway determining, based on the context and the geographic area-specific policy, an appropriate source IP address to use in servicing the request.

22. The method of claim 21, wherein the context comprises a type of content requested by the requesting subscriber, and determining, based on the context and the geographic area-specific policy, an appropriate source IP address comprises:
the gateway analyzing one or more location-specific rules from the geographic area-specific policy associated with the type of content requested;
the gateway determining if localized reconciliation is required based on the type of content and the one or more location-specific rules associated with the type of content; and
the gateway determining the appropriate source IP address based on whether localized reconciliation is required.

23. The method of claim 22, wherein, if localized reconciliation is not required, using an IP address associated with the geographic area of the gateway as the appropriate source IP address.

24. The method of claim 22, wherein, if localized reconciliation is required, using an IP address associated with the geographic area of the subscriber as the appropriate source IP address.

25. The method of claim 22, wherein the gateway comprises a virtual DNS module including a plurality of virtual DNS servers, and wherein one or more of the plurality of virtual DNS servers is associated with each geographic area serviced by the gateway.

26. The method of claim 25, wherein, if localized reconciliation is required, using an IP address of a virtual DNS server associated with the geographic area of the gateway as the appropriate source IP address.

27. The method of claim 25, wherein, if localized reconciliation is required, using an IP address of a virtual DNS server associated with the geographic area of the requesting subscriber as the appropriate source IP address.

28. The method of claim 8, wherein the geographic area-specific policy comprises one or more location-specific rules, the location-specific rules comprising one or more of: governing laws and regulations for content access applicable within the geographic area of the requesting subscriber; content access regulations of a content-provider applicable to the geographic area of the requesting subscriber; language preference applicable to the geographic area of the requesting subscriber.

* * * * *